United States Patent [19]

Sato

[11] Patent Number: 5,170,753
[45] Date of Patent: Dec. 15, 1992

[54] SEA WATER COOLING APPARATUS FOR MARINE DIESEL ENGINE

[75] Inventor: Fumihide Sato, Oyama, Japan

[73] Assignee: Kabushiki Kaisha Komatsu Seisakusho, Tokyo, Japan

[21] Appl. No.: 773,613

[22] PCT Filed: Mar. 14, 1991

[86] PCT No.: PCT/JP91/00346
§ 371 Date: Nov. 13, 1991
§ 102(e) Date: Nov. 13, 1991

[87] PCT Pub. No.: WO91/14084
PCT Pub. Date: Sep. 19, 1991

[30] Foreign Application Priority Data

Mar. 14, 1990 [JP] Japan .................. 2-26519
Mar. 14, 1990 [JP] Japan .................. 2-26520

[51] Int. Cl.$^5$ ............................. F01P 7/14
[52] U.S. Cl. ................... 123/41.09; 123/41.31; 236/101 C
[58] Field of Search .......... 123/41.02, 41.08, 41.09, 123/41.31, 41.33; 137/540; 236/92 R, 92 C, 101 C

[56] References Cited

U.S. PATENT DOCUMENTS

| | | | |
|---|---|---|---|
| 3,782,412 | 1/1974 | Darash | 137/540 |
| 3,835,822 | 9/1974 | Mickle et al. | 123/41.31 |
| 4,399,775 | 8/1983 | Tanaka et al. | 123/41.08 |
| 4,991,545 | 2/1991 | Yoshimura | 123/41.09 |

FOREIGN PATENT DOCUMENTS 47-22041  7/1972  Japan .

Primary Examiner—Noah P. Kamen
Attorney, Agent, or Firm—Richards, Medlock & Andrews

[57] ABSTRACT

A sea water cooling apparatus for a marine diesel engine with a supercharger is provided with a thermostat to recycle at least part of the cooling water through a first bypass line to the inlet of the sea water pump until the warming up operation has been accomplished. A second bypass line containing a valve is provided between the inlet of the thermostat and the water outlet to the sea, in order to achieve a satisfactory large output if a rapid accelerating operation is performed after the warming up operation has been performed or in case of an operation under a large load. The valve in the second bypass line can be operated responsive to the sea water pump discharge pressure, or the discharge pressure of the supercharger, and/or the engine revolution speed. A fuel cooler can be included in the outlet conduit of the sea water pump, with the fuel cooler, the engine and a fuel tank being connected to one another by fuel conduits.

20 Claims, 4 Drawing Sheets

SEA WATER COOLING APPARATUS FOR MARINE DIESEL ENGINE

FIELD OF THE INVENTION

The present invention relates to a sea water cooling apparatus for a marine diesel engine with a supercharger.

BACKGROUND ART

Hitherto, a sea water cooling apparatus for a marine diesel engine with a supercharger for use in a power boat or the like has been structured as shown in FIGS. 9 or 10. A sea water pump 4 has, on the inlet side thereof, an inlet conduit 6 the opening of which is positioned below the sea level 11 and, on the outlet side thereof, it has outlet conduits 7a and 7b through which cooling sea water passes and in which an after cooler 3 for the supercharger, an oil cooler 2 for the engine and an engine 1 are disposed. A thermostat 5 is disposed between the outlet conduits 7a and 7b, the thermostat 5 and the inlet conduit 6 of the sea water pump 4 being connected to each other by a bypass conduit 8. A fuel injection pump (omitted from illustration) is provided with an overflow valve for equalizing the temperature and the pressure of the fuel in such a manner that it is connected to a fuel tank 13 by an overflow conduit 15. When the engine 1 is operated under light load and thereby shows low temperature, the thermostat 5 is completely closed and cooling sea water supplied from the sea water pump 4 is warmed up by the engine 1 before it circulates the outlet conduit 7a, the thermostat 5 and the bypass conduit 8 so that the warming up operation is performed. When the load of the engine 1 is enlarged and thereby the temperature of cooling sea water is raised to a predetermined level, the thermostat 5 is completely opened so that cooling sea water cools the after cooler 3 for the supercharger, the oil cooler 2 for the engine and the engine 1 before it is discharged to the sea level 11 via the outlet conduit 7a, the thermostat 5 and the outlet conduit 7b.

However, in the sea water cooling apparatus for a marine diesel engine with a supercharger constituted in such a manner that the after cooler 3, the oil cooler 2 and the engine 1 are disposed in series, a problem arises in that a satisfactory large output cannot be obtained because the temperature of air at the outlet port of the after cooler is undesirably raised by the thermostat in a case where a rapid acceleration operation is performed after the warming-up operation has been performed or in a case of an operation under large load.

Another problem arises in that the temperature of fuel in the fuel tank is undesirably raised by fuel returned from the overflow valve, and, in particular, that the output is undesirably reduced if the quantity of fuel in the fuel tank is reduced.

SUMMARY OF THE INVENTION

An object of the present invention is to overcome the above-described conventional problems by providing a sea water cooling apparatus for a marine diesel engine which is arranged in such a manner that an opening/closing valve device is disposed in the bypass conduit, with which a satisfactory large output can be obtained even if a rapid accelerating operation is performed after the warming up operation has been performed or in a case of an operation under large load and in which fuel can be effectively cooled by a fuel cooler.

A first aspect of the present invention lies in a sea water cooling apparatus for a marine diesel engine with a supercharger arranged in such a manner that an after cooler, an oil cooler and an engine are disposed on the outlet side of a sea water pump, a thermostat is disposed in an outlet conduit for cooling sea water disposed next to the sea water pump and the thermostat and an inlet conduit of the sea water pump are connected to each other by a bypass conduit, the sea water cooling apparatus comprising: a second bypass conduit for establishing a connection between the upstream side of the thermostat and the downstream side of the thermostat and an opening/closing valve device inserted into the second bypass conduit.

Therefore, the degree of opening of the opening/closing valve device can be controlled and the undesirable rise in the temperature of the air at the outlet port of the after cooler by the thermostat can be prevented even if a rapid accelerating operation is performed after the warming up operation has been performed or in a case of an operation under large load.

A second aspect of the present invention lies in an additional arrangement to the above-described aspect in which a fuel cooler is disposed in the outlet conduit for cooling sea water at a position between the sea water pump and the thermostat; and the fuel cooler, the engine and a fuel tank provided for the engine are connected to one another by a fuel conduit.

As a result of the above-described structure, fuel can effectively be cooled.

The opening/closing valve device comprises: a plunger having a plurality of small apertures; and a cylinder including a spring and arranged in such a manner that the plunger is completely opened when the discharge pressure from the sea water pump exceeds the setting pressure for the spring. Another structure may be employed in which it comprises: a cylinder including a butterfly type opening/closing valve; a cylinder having a suction port for the discharge pressure from the supercharger and including a piston rod and a spring; and a link for establishing a connection between the opening/closing valve and the piston rod and which is arranged in such a manner that the opening/closing valve is completely opened when the discharge pressure from the supercharger exceeds the setting pressure of the spring. The opening/closing valve device may comprise: a cylinder including a butterfly type opening/closing valve, a rod, an end portion of which is rotatably connected to the shaft of the opening/closing valve and another end portion of which has a solenoid; and a controller for controlling the operation of the solenoid by detecting the discharge pressure from the supercharger and the engine revolution speed and arranged in such a manner that the opening/closing valve is completely opened when the discharge pressure from the supercharger and the engine revolution speed respectively exceed predetermined values.

BEST MODE FOR CARRYING OUT THE INVENTION

Figure 1:
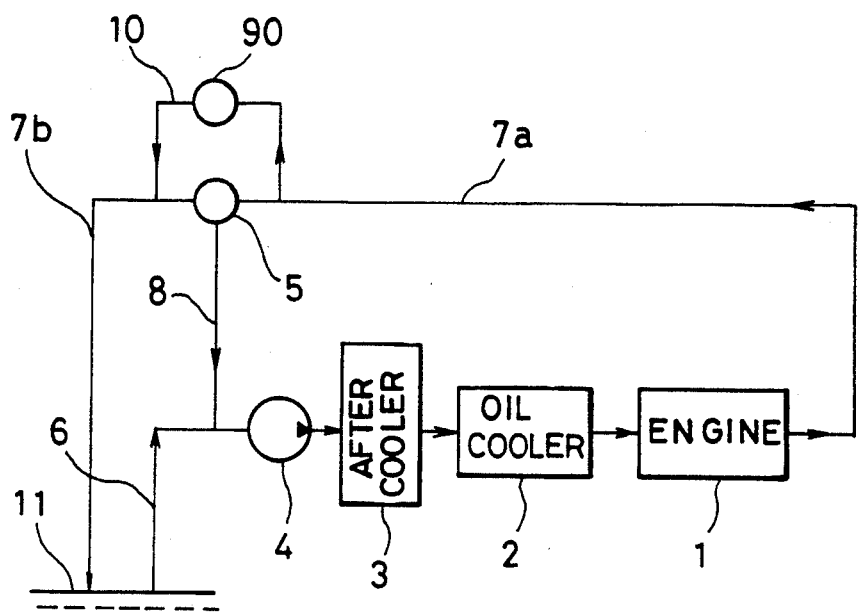
FIG. 1 is a circuit diagram which illustrates a first mode of a sea water cooling apparatus according to the present invention.

The structure of a first mode of the present invention will now be described with reference to FIG. 1. Referring to FIG. 1, the same elements as those according to the conventional structure are given the same reference numerals. A sea water pump 4 has, on the inlet side thereof, an inlet conduit 6 the opening of which is positioned below the sea level 11 and, on the outlet side thereof, it has outlet conduits 7a and 7b through which cooling sea water passes and in which an after cooler 3 for the supercharger, an oil cooler 2 for the engine and an engine 1 are disposed. A thermostat 5 is disposed between the outlet conduits 7a and 7b, the thermostat 5 and the inlet conduit 6 of the sea water pump 4 being connected to each other by a bypass conduit 8. A second bypass conduit 10 having an opening/closing valve device 90, which is controlled by the load of the engine 1, is disposed in parallel to the outlet conduits 7a and 7b in such a manner that it bypasses the thermostat 5. The engine 1 performs the low load operation.

When the engine 1 is accelerated and its load is thereby enlarged, the opening/closing valve device 90 is opened. In accordance with the rise in the temperature of cooling sea water, the thermostat 5 is also opened so that cooling sea water introduced from the outlet conduit 7a is branched into flows which are respectively introduced into the opening/closing valve unit 90 and the thermostat 5 in such a manner that a portion of sea water is then discharged to the sea level 11 after two flows have again joined together in the outlet conduit 7b and another portion of it is then circulated to the inlet portion of the sea water pump 4 through the first bypass conduit 8.

When the load of the engine 1 is enlarged to a predetermined level and also the temperature of cooling sea water is raised to a predetermined level, the opening/closing valve device 90 and the thermostat 5 are completely opened, causing the overall quantity of cooling sea water introduced from the outlet conduit 7a to join together in the outlet conduit 7b before it is discharged to the sea level 11.

As described above, according to this mode, cooling sea water can be controlled in accordance with the temperature and the load of the engine.

The structure of a second mode of the present invention will now be described with reference to FIG. 2.

Figure 2:
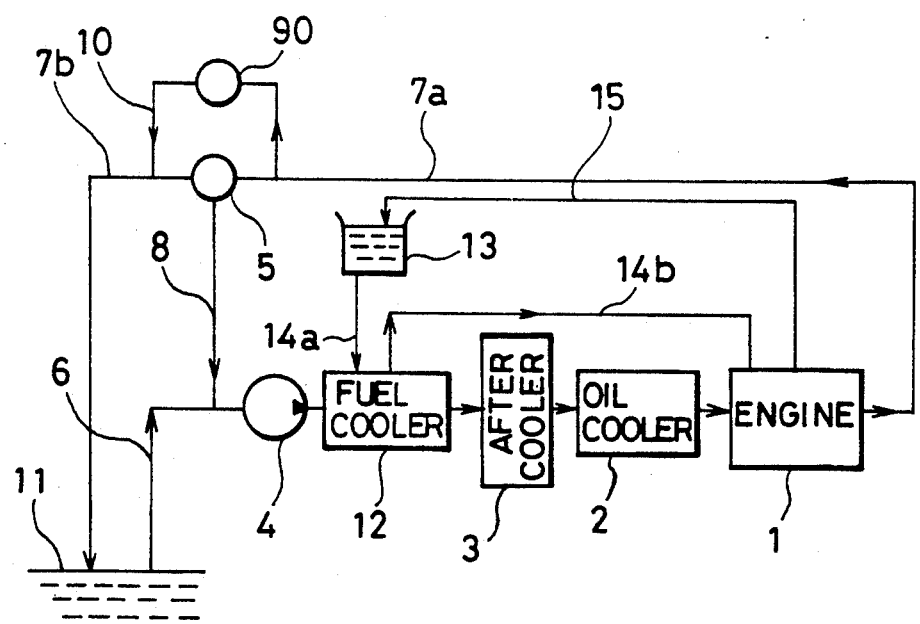
FIG. 2 is a circuit diagram which illustrates a second mode of the sea water cooling apparatus according to the present invention.

Referring to FIG. 2, the same elements as those shown in FIG. 1 are given the same reference numerals and their descriptions are omitted here. On the outlet port side of the sea water pump 4, a fuel cooler 12 is inserted. The fuel cooler 12 has a fuel inlet conduit 14a connected to the fuel tank 13 and an outlet conduit 14b connected to the engine 1. A fuel injection pump (omitted from illustration) of the engine 1 is provided with an overflow valve for equalizing the temperature and pressure of fuel. The above-described valve and the fuel tank 13 are connected to each other by the overflow conduit 15. Although the temperature in the fuel tank 13 is raised by fuel returned from the overflow conduit 15, it can be effectively cooled by the above-described fuel cooler 12.

The remaining operations are performed similarly to those according to the first mode and thereby their descriptions are omitted here.

According to this mode, fuel can be effectively cooled by a simple structure in addition to the effect obtainable from the above-described first mode.

Figure 3:
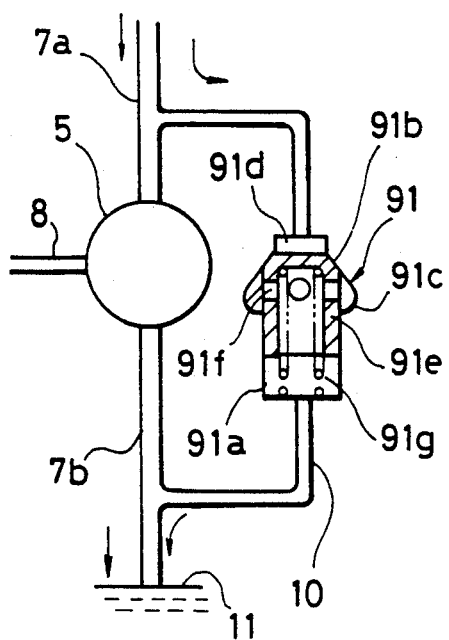
FIG. 3 is an enlarged view which illustrates an opening/closing valve device according to the present invention.
Figure 4:
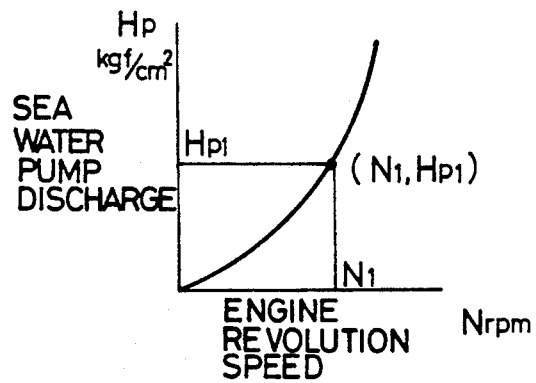
FIG. 4 is a graph which illustrates the relationship between the engine revolution speed and the discharge pressure from the sea water pump.

FIG. 3 is an enlarged view which illustrates an opening/closing valve device 91 which is operated in accordance with the discharge pressure from the sea water pump 4 according to the present invention. Referring to the drawing, a cylinder 91a having a seating surface 91b and water chambers 91c and 91d is disposed in parallel to the outlet conduits 7a and 7b, the cylinder 91a being disposed in the second bypass conduit 10 which is continuously formed to bypass the thermostat 5. A plunger 91e of a hollow type and having a plurality of small apertures 91f is included in the cylinder 91a in such a manner that it is brought into close contact with the seating surface 91b by a spring 91g. FIG. 4 is a graph which illustrates the relationship between engine revolution speed N and sea water pump discharge pressure Hp. The set pressure for the spring 91g is made to be the same as discharge pressure $Hp_1$ from the sea water pump When the engine revolution speed is, as shown in FIG. 3, $N_1$.

As a result of the above-described setting, cooling sea water introduced from the outlet conduit 7a passes through the second bypass conduit 10 to completely open the plunger 91e so as to be discharged to the sea level 11 through the outlet conduit 7b from a plurality of the small apertures 91f when the discharge pressure from the sea water pump exceeds $Hp_1$. Since the operation of the thermostat 5 is performed similarly to that shown in FIG. 1, its description is omitted here.

Figure 5:
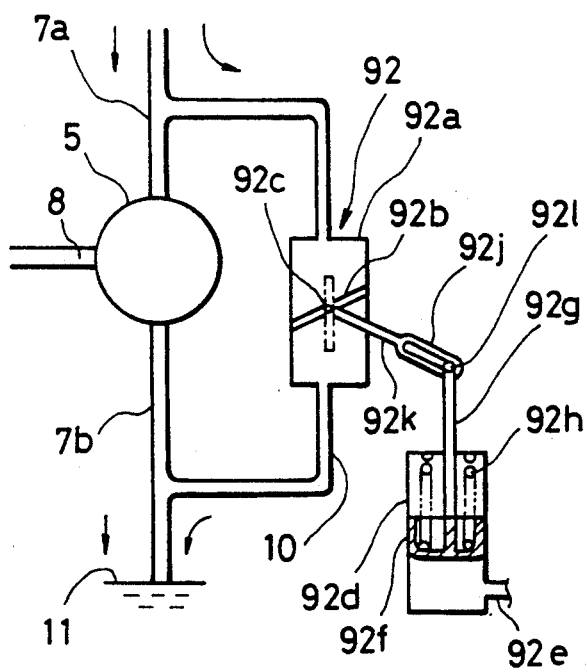
FIG. 5 is an enlarged view which illustrates an applicable example of the opening/closing valve device shown in FIG. 3.
Figure 6:
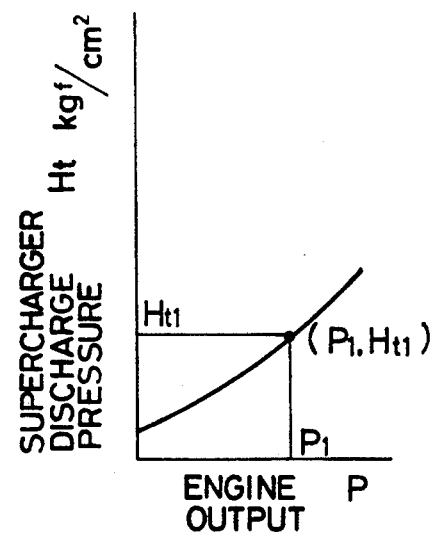
FIG. 6 is a graph which illustrates the relationship between the engine output and the discharge pressure from the supercharger.

FIG. 5 is an enlarged view which illustrates an opening/closing valve device 92 which is operated in accordance with the discharge pressure from the supercharger, wherein an example of an application of the structure shown in FIG. 3 is shown. A cylinder 92a including a butterfly type opening/closing valve 92b is disposed in parallel to the outlet conduits 7a and 7b, the cylinder 92a being disposed in the second bypass conduit 10 which is continuously formed to bypass the thermostat 5. A shaft 92c is an attachment shaft for attaching the opening/closing valve 92b, the shaft 92c being connected to a link 92k having an elongated hole 92j. A piston 92f of an actuator is, via a spring 92h, fastened to a cylinder 92d which opens in a discharge pressure suction port 92e of the supercharger. A rod 92g is integrally formed with the piston 92f in such a manner that it is, by a pin 92l, slidably connected to an elongated hole 92j formed in a link 92k. FIG. 6 is a graph which illustrates the relationship between engine output P and supercharger discharge pressure Ht. The setting pressure for the spring 92h is made to be the same as discharge pressure $Ht_1$ from the supercharger when the engine output is $P_1$. As a result of the above-described setting, the discharge pressure from the supercharger supplied through the suction port 92e acts on the piston 92f and the rod 92g against the action of the spring 92h when the discharge pressure from the supercharger exceeds $Ht_1$. As a result, the pin 92l slides in the elongated, hole 92j formed in the link 92k so as to rotate the link 92k about the shaft 92c. Thus, the opening/closing valve 92b integrally formed with the shaft 92c is completely opened. Cooling sea water introduced from the outlet conduit 7a passes through the second bypass conduit 10 before it is discharged to the sea level 11 through the outlet conduit 7b.

Figure 7:
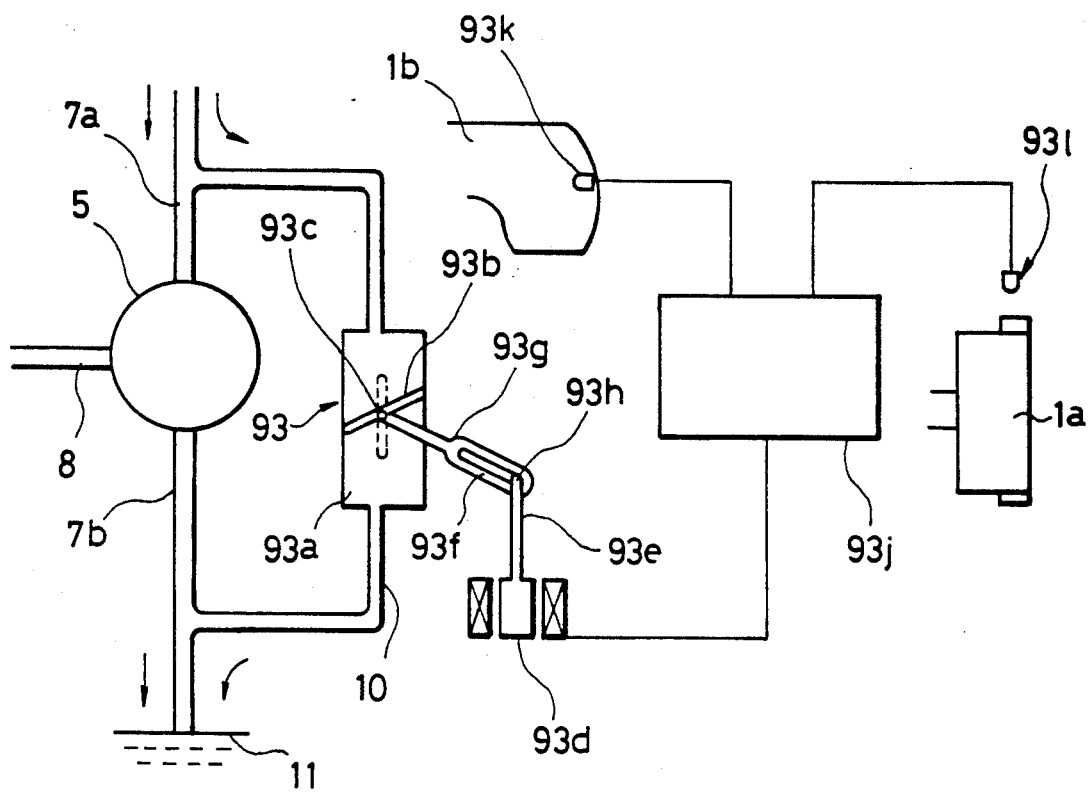
FIG. 7 is an enlarged view which illustrates another applicable example of the opening/closing valve device shown in FIG. 3.
Figure 8:
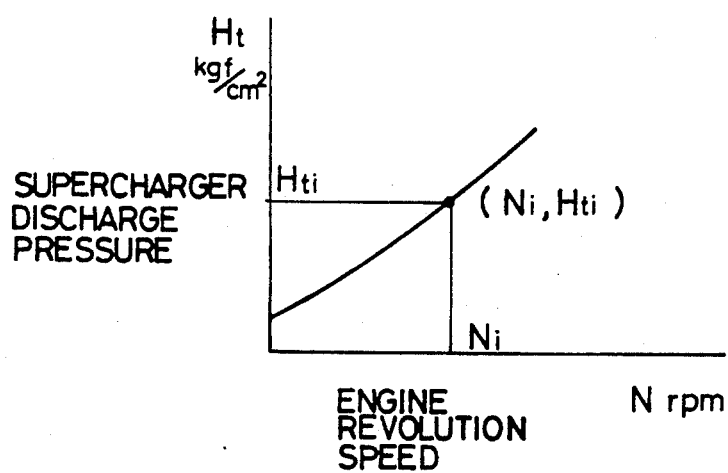
FIG. 8 illustrates the relationship between the engine revolution speed and the discharge pressure from the supercharger.
Figure 9:
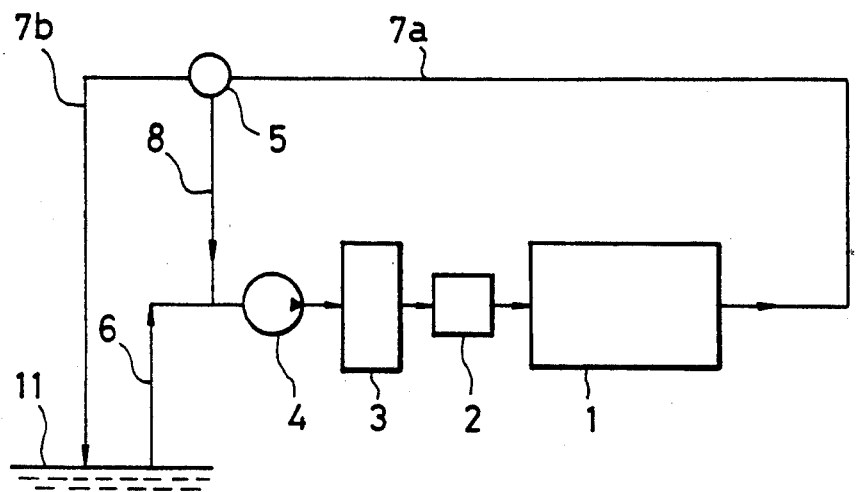
FIGS. 9 and 10 are circuit diagrams for use in a conventional sea water cooling apparatus.
Figure 10:
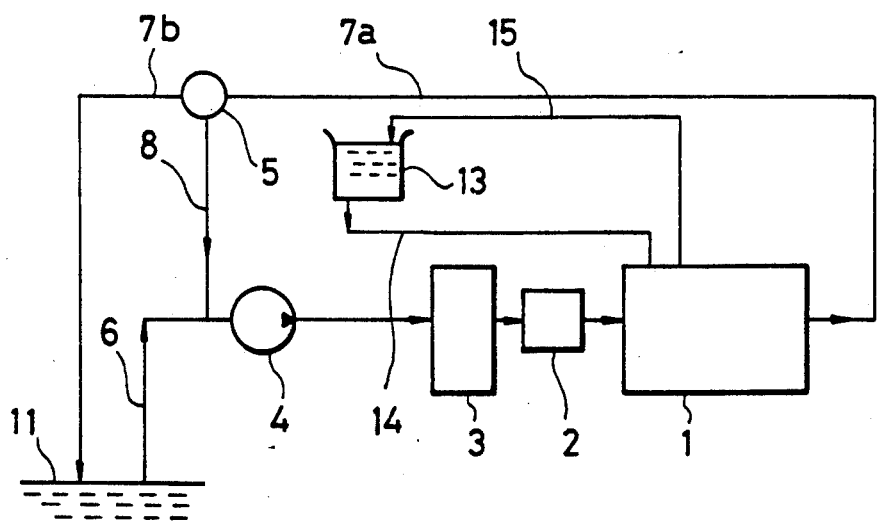

FIG. 7 is an enlarged view which illustrates an opening/closing valve device 93 which is operated in accordance with the discharge pressure from the supercharger and the engine revolution speed, wherein another example of an application of the structure shown in FIG. 3 is illustrated. The cylinder 93a including a butterfly type opening/closing valve 93b is disposed in parallel to the outlet conduits 7a and 7b, the cylinder 93a being disposed in the second bypass conduit 10 which is connected to bypass the thermostat 5. A shaft 93c is an attaching shaft for attaching the opening/closing valve 93b, the shaft 93c being connected to a link 93g having an elongated hole 93f. The actuator is a solenoid 93d disposed at the end portion of a rod 93e. The operation of the solenoid 93d is controlled by a controller 93j to which a signal from a supercharger discharge pressure sensor 93k in a suction pipe 1b and a signal from an engine revolution speed sensor 93l from a flywheel 1a are supplied. The rod 93e of the solenoid 93d is connected to the elongated hole 93f by a pin 93h. FIG. 8 is a graph which illustrates the relationship between engine revolution speed N and supercharger discharge pressure Ht. The solenoid 93d is arranged to be operated when the above-described two sensors meet conditions that the engine revolution speed is Ni and the discharge pressure from the supercharger is Hti. Any combination may, of course, be employed such that $i = 1, \ldots, n$.

As a result of the above-described setting, the solenoid 93d is operated by the controller 93j when the engine revolution speed is Ni and the discharge pressure from the supercharge is Hti. As a result, the pin 93f is rotated to completely open the opening/closing valve 93b which is integrally formed with the shaft 93c. Therefore, cooling sea water introduced from the outlet conduit 7a passes through the second bypass conduit 10 before it is discharged to the sea level 11 via the outlet conduit 7b. Although the link device shown in FIG. 7 is arranged in such a manner that the elongated hole 93f is formed in the link 93g, another structure may be employed in which the above-described elongated hole 93f is omitted, the solenoid 93d and the rod 93e are separated from each other and the end portions of the link 93g and the rod 93e and the end portions of the rod 93e and the solenoid 93d are respectively connected to each other by the pins 93h. As described above, a variety of design modifications may be performed within the scope of the present invention.

INDUSTRIAL APPLICABILITY

According to the present invention, there is provided an advantageous sea water cooling apparatus for a marine diesel engine which is arranged in such a manner that an opening/closing valve device is disposed in the bypass conduit, with which a satisfactory large output can be obtained even if a rapid accelerating operation is performed after the warming up operation has been performed or in a case of an operation under a large load and in which fuel can be effectively cooled by the fuel cooler.

What is claimed is:

1. Apparatus comprising a marine engine; a thermostat having an inlet, a bypass outlet and a drain outlet; a sea water pump having an inlet and an outlet; an inlet conduit for providing passage of cooling sea water from a source thereof to said inlet of said pump; an outlet conduit for passing cooling sea water from said outlet of said pump through said engine to said inlet of said thermostat; a first bypass conduit for passing sea water from said bypass outlet of said thermostat to said inlet of said pump, a drain conduit connected to said drain outlet of said thermostat for draining sea water from said outlet conduit; a second bypass conduit for providing fluid connection between said drain conduit and a portion of said outlet conduit which is between said engine and said inlet of said thermostat; and a valve positioned in said second bypass conduit; whereby said thermostat connects said outlet conduit to said first bypass conduit during a warming up operation and connects said outlet conduit to said drain conduit when the temperature of the sea water passing through said thermostat is raised to a predetermined value.

2. Apparatus in accordance with claim 1 further comprising means for controlling the degree of opening of said valve in response to an operating condition such that a satisfactorily large output of cooling sea water can be obtained in said outlet conduit when a rapid accelerating operation is performed after the warming up operation has been performed and when the engine is operated under a large load.

3. Apparatus in accordance with claim 1 wherein said valve is actuatable responsive to an operating condition and said thermostat is actuatable responsive to the temperature of the cooling sea water passing therethrough such that the sea water from said outlet conduit can be branched into flows which are respectively introduced into said valve and into said thermostat in such a manner that a portion of the sea water passing through said valve and a portion of the sea water passing through said thermostat are joined together and discharged while another portion of the sea water passing through said thermostat is then circulated through said first bypass conduit to the inlet of said pump.

4. Apparatus in accordance with claim 1 further comprising a solenoid for actuating said valve between a completely closed position and a completely opened position.

5. Apparatus in accordance with claim 1 wherein said valve is actuatable responsive to the pressure of the sea water discharged by said pump through said outlet conduit.

6. Apparatus in accordance with claim 5 wherein said valve comprises a cylinder, a plunger positioned in said cylinder and movable between an opened position and a closed position, a spring positioned in said cylinder to bias said plunger toward said closed position, whereby said valve is completely opened when the pressure of the sea water discharged by said pump through said outlet conduit exceeds the setting pressure of said spring.

7. Apparatus in accordance with claim 6 wherein said plunger has a plurality of small apertures therethrough which are blocked in said closed position and are not blocked in said opened position.

8. Apparatus in accordance with claim 1 wherein said engine has a supercharger with an after cooler, wherein said engine has an oil cooler, and wherein said outlet conduit passes sea water from said outlet of said pump through said after cooler, said oil cooler, and said engine to said inlet of said thermostat.

9. Apparatus in accordance with claim 1 wherein said engine has a supercharger with an after cooler; wherein said engine has an oil charger; wherein said engine has a fuel tank and a fuel cooler with fuel conduits connecting the fuel tank, the fuel cooler and the engine to one another; and wherein said outlet conduit passes sea water from said outlet of said pump through said fuel cooler, said after cooler, said oil cooler, and said engine to said inlet of said thermostat.

10. Apparatus in accordance with claim 9 wherein said marine engine is a marine diesel engine.

11. Apparatus in accordance with claim 10 wherein said valve is actuatable responsive to the pressure of the sea water discharged by said pump through said outlet conduit.

12. Apparatus in accordance with claim 10 wherein said valve is actuatable responsive to the discharge pressure of said supercharger.

13. Apparatus in accordance with claim 10 wherein said valve is actuatable responsive to the revolution speed of said engine.

14. Apparatus in accordance with claim 10 wherein said valve is actuatable responsive to the discharge pressure of said supercharger and the revolution speed of said engine.

15. Apparatus in accordance with claim 10 further comprising a first sensor for detecting the discharge pressure of said supercharger, a second sensor for detecting the revolution speed of said engine, and a controller for controlling the operation of said valve responsive to the outputs of said first and second sensors such that said valve is in a completely opened position when said discharge pressure of said supercharger and said engine revolution speed exceed respectively predetermined values.

16. Apparatus comprising a marine engine; a thermostat having an inlet, a bypass outlet and a drain outlet; a sea water pump having an inlet and an outlet; an inlet conduit for providing passage of cooling sea water from a source thereof to said inlet of said pump; an outlet conduit for passing cooling sea water from said outlet of said pump through said engine to said inlet of said thermostat; a first bypass conduit for passing sea water from said bypass outlet of said thermostat to said inlet of said pump, a drain conduit connected to said drain outlet of said thermostat for draining sea water from said outlet conduit; a second bypass conduit for providing fluid connection between said drain conduit and a portion of said outlet conduit which is between said engine and said inlet of said thermostat; and a valve positioned in said second bypass conduit; whereby said thermostat connects said outlet conduit to said first bypass conduit during a warming up operation and connects said outlet conduit to said drain conduit when the temperature of the sea water passing through said thermostat is raised to a predetermined value;

wherein said engine has a supercharger, and wherein said valve is actuatable responsive to the discharge pressure of said supercharger.

17. Apparatus in accordance with claim 16 wherein said valve comprises a cylinder, a valve device positioned in said cylinder and having an opened position and a closed position, a spring for biasing said valve device to said closed position, said valve device being moveable responsive to the discharge pressure of said supercharger, whereby said valve is opened when the discharge pressure of said supercharger exceeds the setting pressure of said spring.

18. Apparatus in accordance with claim 16 wherein said valve comprises a cylinder, a butterfly valve device positioned in said cylinder, a rod for rotating said butterfly valve device between a closed position and an opened position, a spring for biasing said rod to position said butterfly valve device in the closed position, said rod being moveable responsive to the discharge pressure of said supercharger, whereby said valve is completely opened when the discharge pressure of said supercharger exceeds the setting pressure of said spring.

19. Apparatus in accordance with claim 18 further comprising a second cylinder, said second cylinder having a suction port for the discharge pressure of said supercharger, wherein said rod is a piston rod positioned in said second cylinder, wherein said spring biases said piston rod in said second cylinder against the pressure in said suction port, said apparatus further comprising a mechanical linkage connecting said piston rod and said butterfly valve device for rotation of said butterfly valve device to said opened position when the discharge pressure of said supercharger exceeds the setting pressure of said spring.

20. Apparatus in accordance with claim 16 further comprising a first sensor for detecting the discharge pressure of said supercharger, a second sensor for detecting the engine revolution speed, and a controller for controlling the operation of said valve responsive to the outputs of said first and second sensors such that said valve is opened when said discharge pressure of said supercharger and said engine revolution speed exceed respectively predetermined values.

* * * * *

UNITED STATES PATENT AND TRADEMARK OFFICE
CERTIFICATE OF CORRECTION

PATENT NO. : 5,170,753
DATED : December 15, 1992
INVENTOR(S) : Fumihide Sato

It is certified that error appears in the above-identified patent and that said Letters Patent is hereby corrected as shown below:

Column 1, line 14, change "FIGS." to --FIG.--.
Column 4, line 39, change "When" to --when--.
Column 5, lines 9 - 10, change "elongated, hole" to --elongated hole--.
Column 7, line 13, change "charger" to --cooler--.

Signed and Sealed this

Fourth Day of January, 1994

Attest:

BRUCE LEHMAN

Attesting Officer    Commissioner of Patents and Trademarks